W. A. CLARKE.
FURNACE.
APPLICATION FILED JAN. 4, 1909.

943,813.

Patented Dec. 21, 1909.
9 SHEETS—SHEET 1.

Witnesses:
W. L. Dow
E. Behel.

Inventor:
William A. Clarke
by A. O. Behel
Attorney

W. A. CLARKE.
FURNACE.
APPLICATION FILED JAN. 4, 1909.

943,813.

Patented Dec. 21, 1909.
9 SHEETS—SHEET 2.

Witnesses:
W. L. Dow.
E. Behel.

Inventor:
William A. Clarke
by A. O. Behel
Attorney

W. A. CLARKE.
FURNACE.
APPLICATION FILED JAN. 4, 1909.

943,813.

Patented Dec. 21, 1909.
9 SHEETS—SHEET 4.

Witnesses:
W. L. Dow.
E. Behel.

Inventor:
William A. Clarke
by A. O. Behel
Attorney

W. A. CLARKE.
FURNACE.
APPLICATION FILED JAN. 4, 1909.

943,813.

Patented Dec. 21, 1909.
9 SHEETS—SHEET 9.

Witnesses:
H. L. Dow
E. Behel

Inventor:
William A. Clarke
by A. O. Behel
Attorney

UNITED STATES PATENT OFFICE.

WILLIAM A. CLARKE, OF ROCKFORD, ILLINOIS, ASSIGNOR TO PIONEER STEEL COMPANY, OF ROCKFORD, ILLINOIS, A CORPORATION OF MAINE.

FURNACE.

943,813.  Specification of Letters Patent.  Patented Dec. 21, 1909.

Application filed January 4, 1909. Serial No. 470,730.

*To all whom it may concern:*

Be it known that I, WILLIAM A. CLARKE, a citizen of the United States, residing at Rockford, in the county of Winnebago and State of Illinois, have invented certain new and useful Improvements in Furnaces, of which the following is a specification.

The object of this invention is to construct a furnace for producing a soft center steel.

In the accompanying drawings.

Figure 1:
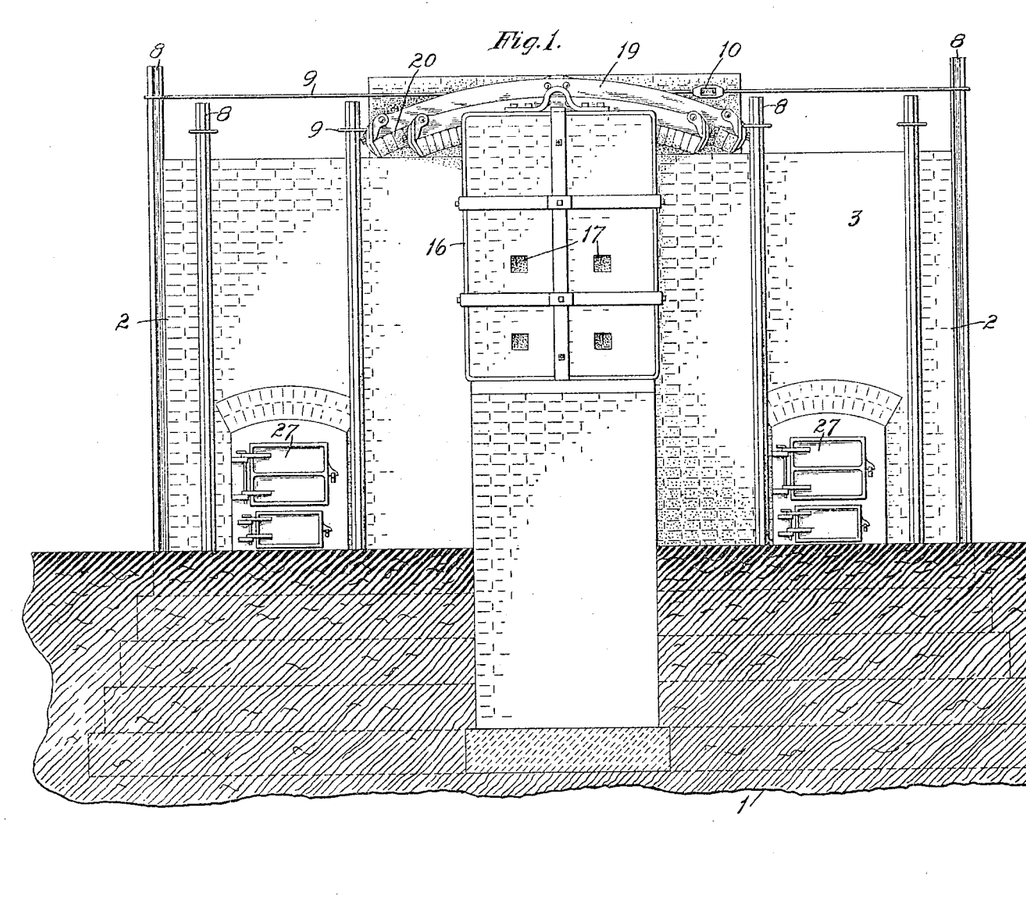
Figure 1 in a front elevation of the furnace.
Figure 2:
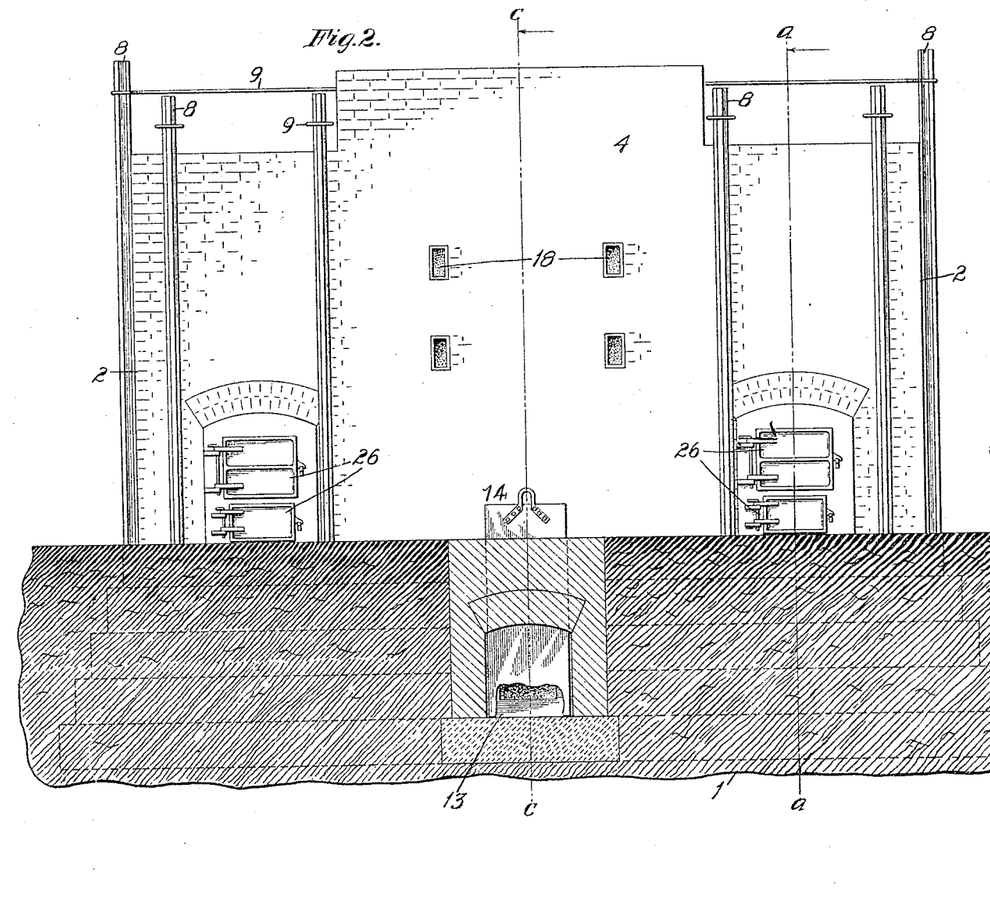
Fig. 2 is a rear elevation.
Figure 3:
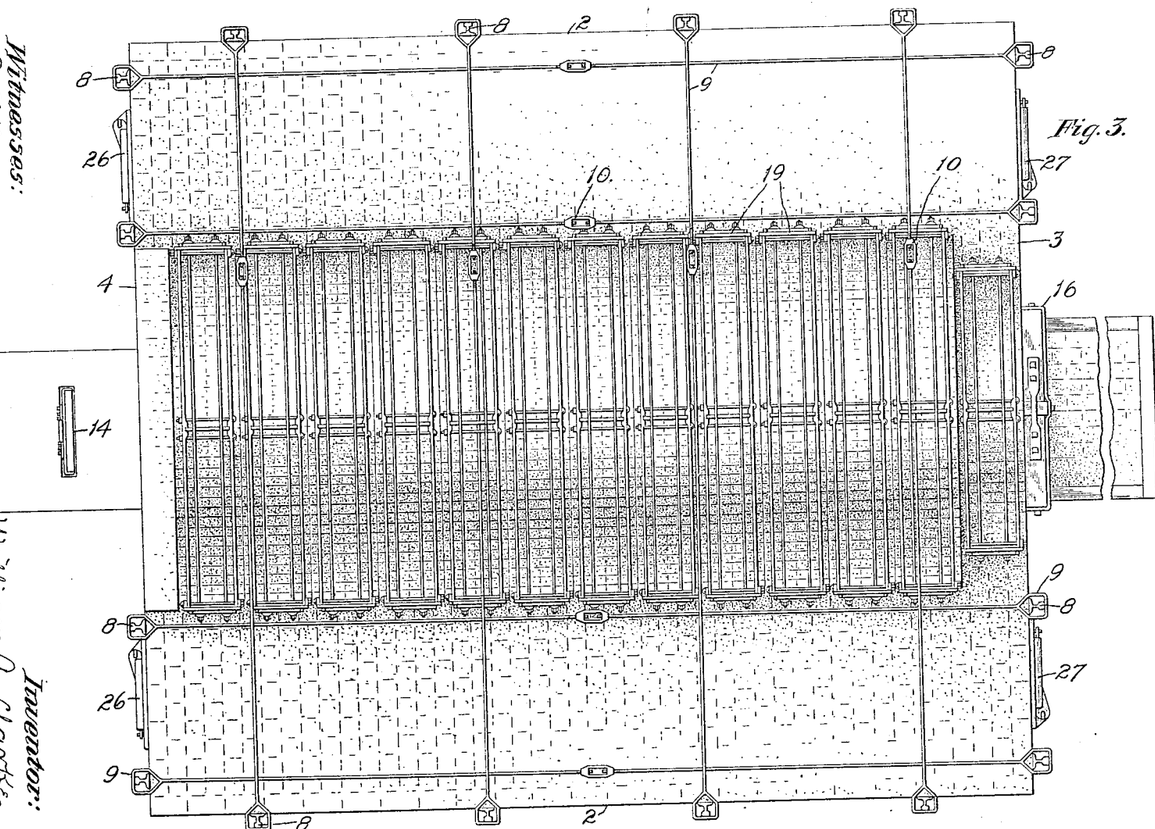
Fig. 3 is a plan view.
Figure 4:
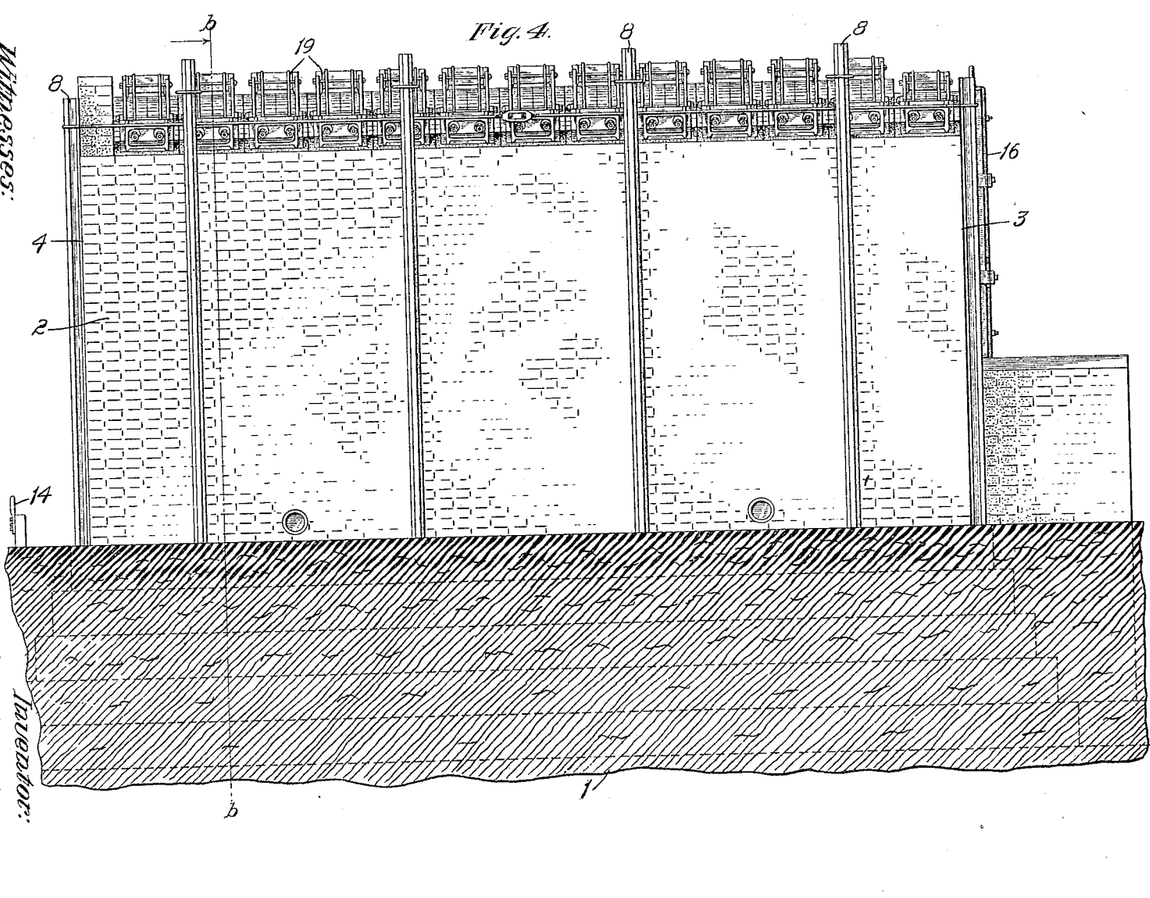
Fig. 4 is a side elevation.
Figure 5:
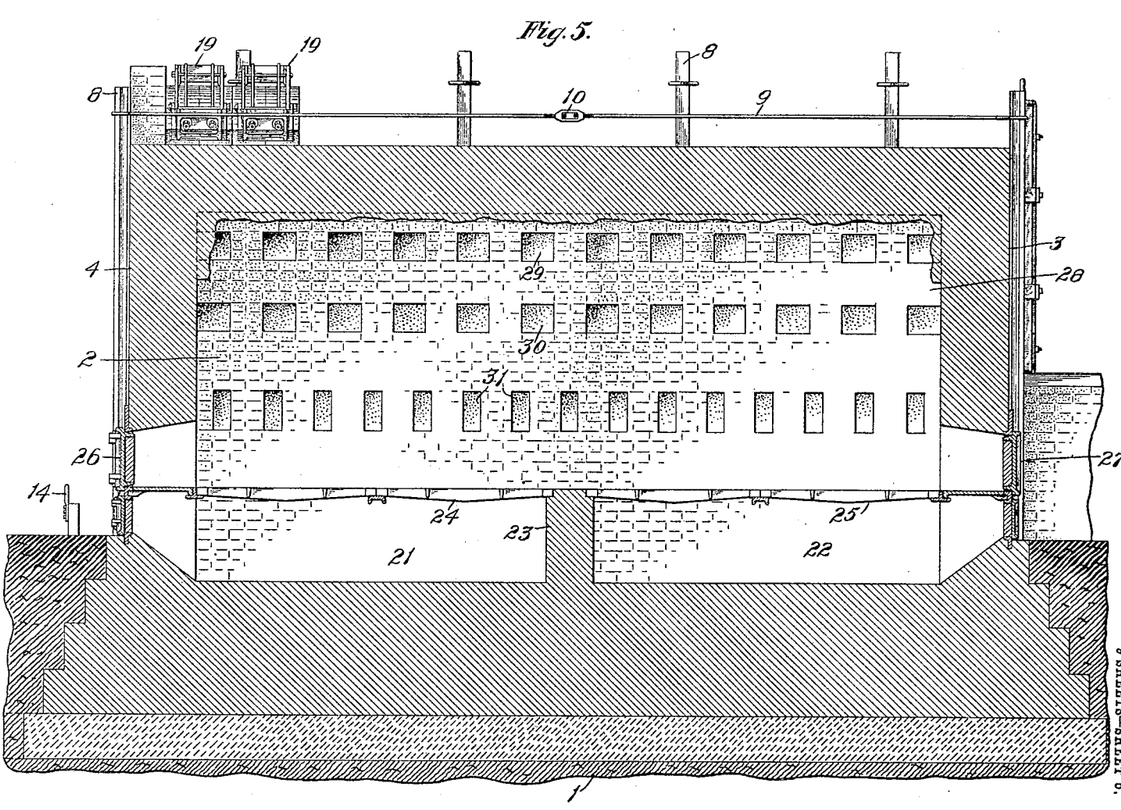
Fig. 5 is a vertical lengthwise section on dotted line *a a* Fig. 2.
Figure 6:
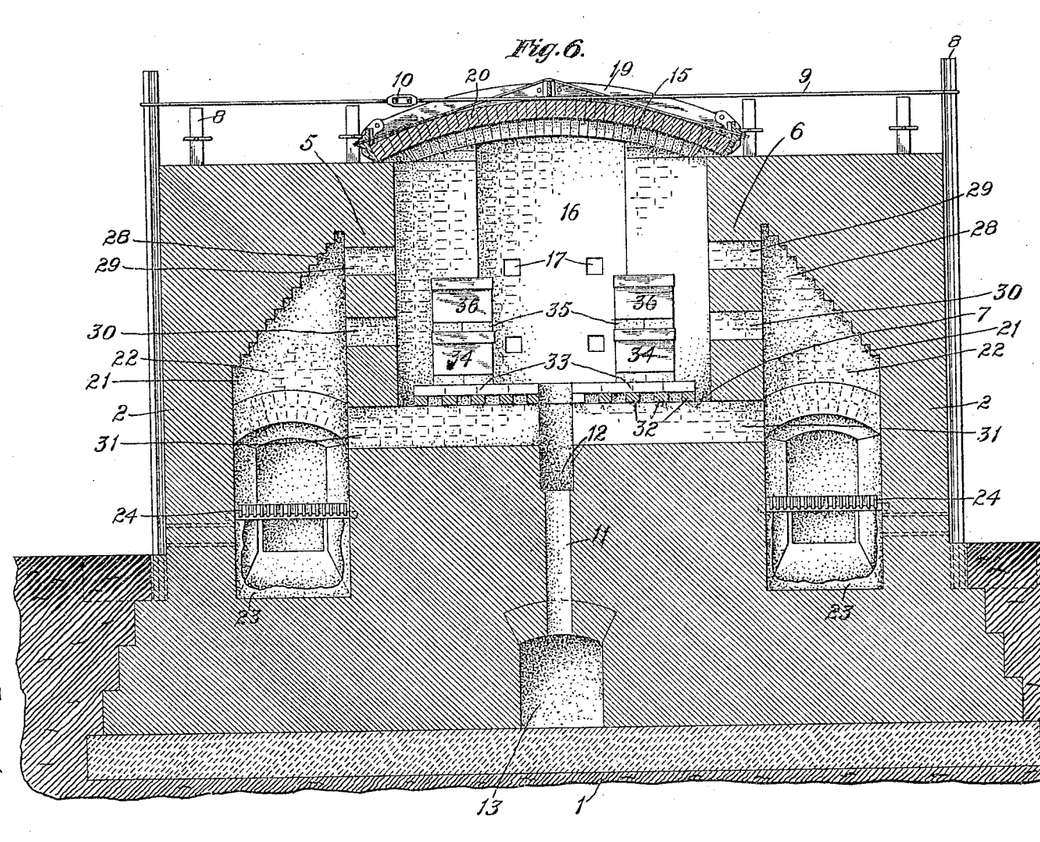
Fig. 6 is a transverse section on dotted line *b b* Fig. 4.
Figure 7:
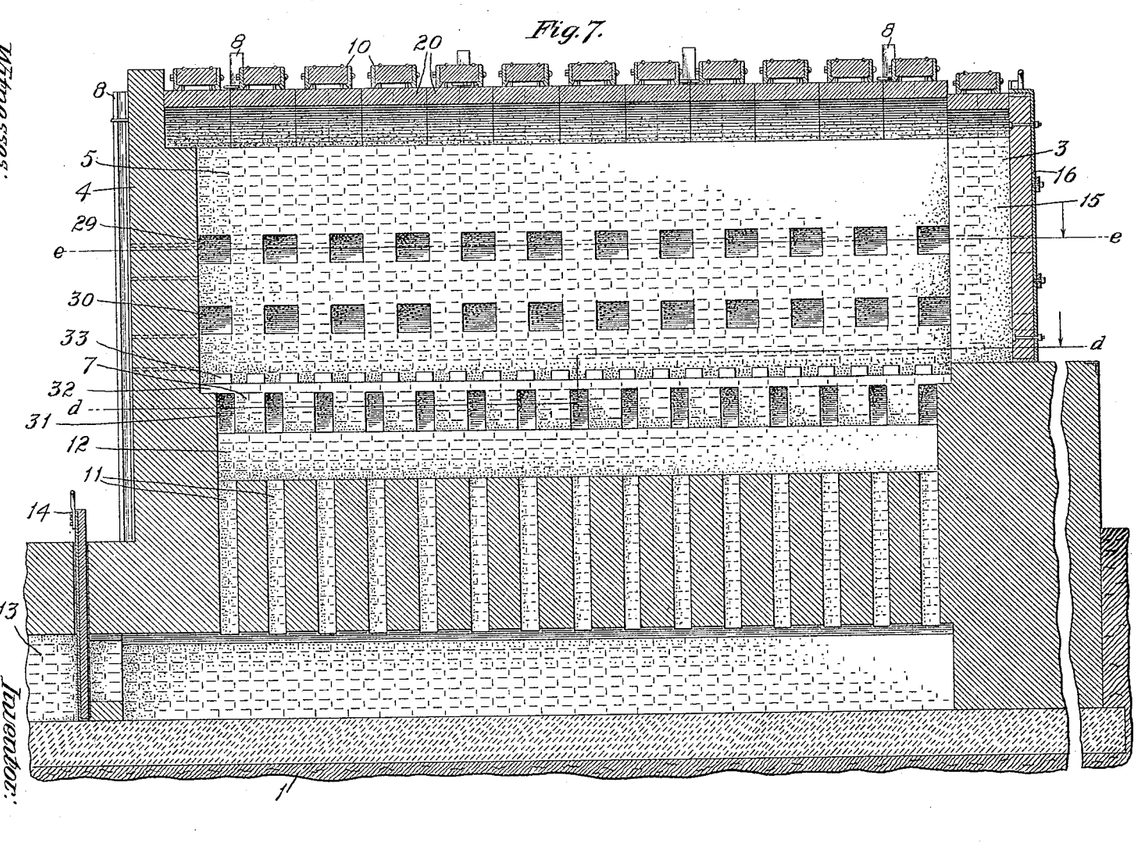
Fig. 7 is a vertical lengthwise section on dotted line *c c* Fig. 2.
Figure 8:
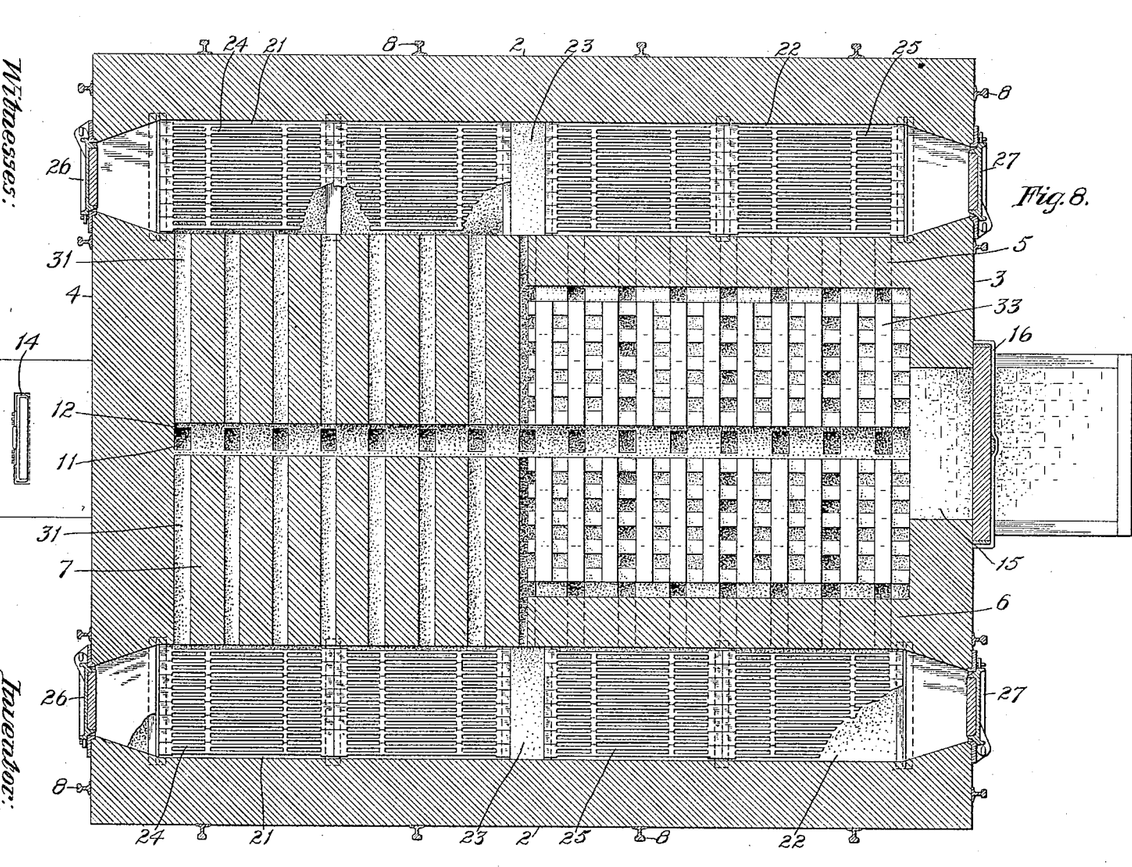
Fig. 8 is a section on dotted line *d d* Fig. 7.
Figure 9:
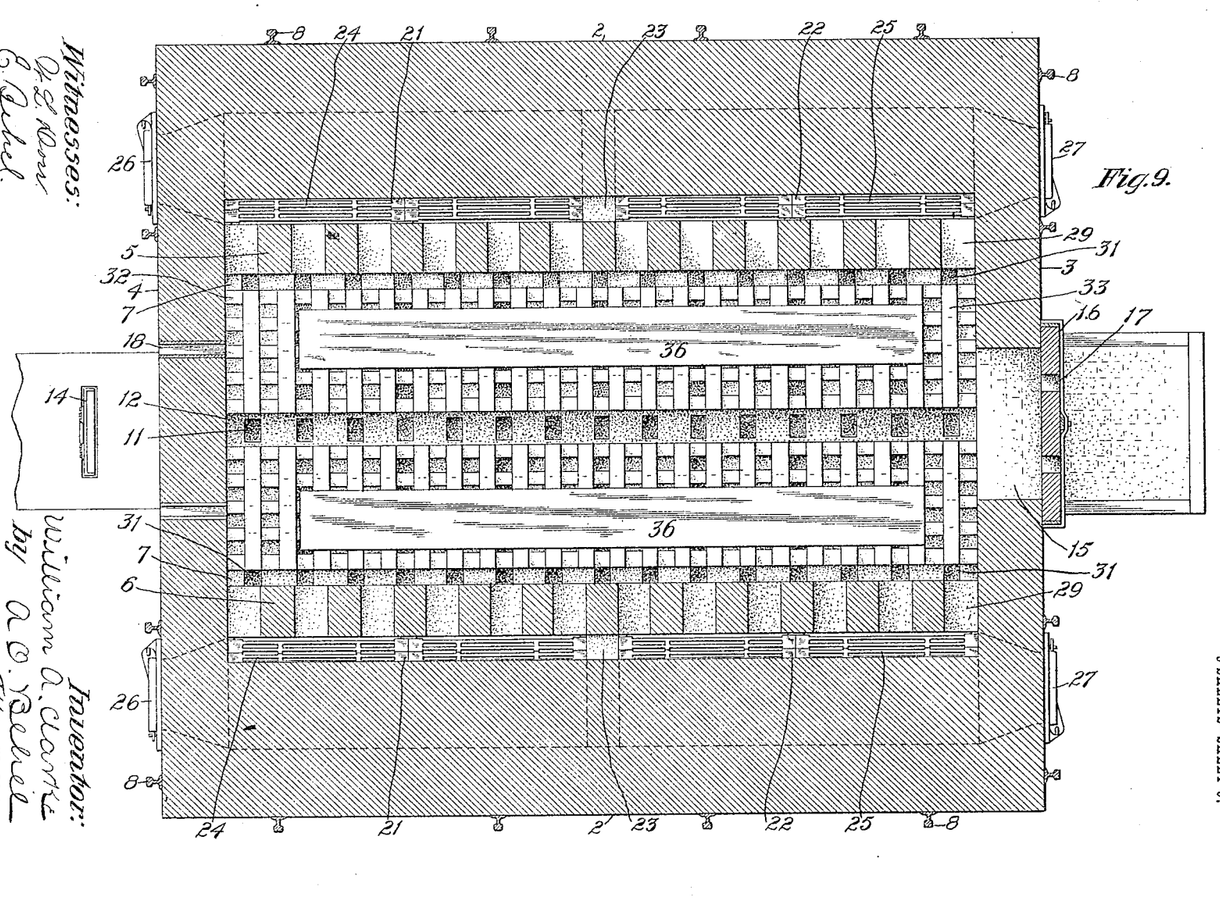
Fig. 9 is a section on dotted line *e e* Fig. 7.

My improved furnace is employed to produce a soft center in plates of steel which are inclosed in metallic boxes and subjected to heat, and for carbonizing all kinds of steel and iron. I lay no claim in this application to the process, but to the furnace only.

As the furnace is of double construction, the same reference numerals will be applied to both sections, a description of one section will be sufficient.

The two sections are supported upon the same foundation 1 and the outer side walls 2 and end walls 3 and 4 are formed of brick work. The two sections are separated by the vertical division walls 5 and 6 leaving an oven between them bounded by said walls, the rear end wall 4, bottom 7 and front end wall 3, and leaving an open top. Metallic bars 8 extend above the top of the kiln having their ends connected by the rods 9 which are tightened by the turn buckles 10. These bars and rods serve to bind the walls together and hold them against spreading.

Through the bottom of the oven are formed descending flues 11, their upper ends communicating with a flue 12 running in the lengthwise direction of the oven, and their lower ends communicating with a flue 13 running in the lengthwise direction of the oven and extending beyond the rear end wall 4 and communicating with a smoke stack or pipe. A damper 14 is movable in a vertical direction to regulate the draft. The front wall 3 is formed with an opening 15 which is closed by the door 16 having a brick inner face. This door is provided with observation holes 17, and the rear wall 4 is provided with observation holes 18.

The top opening over the oven is closed with a series of bungs 19 formed of trussed bars which support a facing of brick 20. These bungs 19 are located side by side to completely close the top opening. The door 16 rests against the end bung and forms a tight joint. The bungs are adapted to be lifted bodily and swing to one side to expose the top opening, or so many of them as may be necessary to place in the oven the boxes containing the material to be treated, and to remove them from the oven.

To each side of the oven is located a fire box formed in the two sections 21 and 22, the ash receptacle divided by the vertical partition 23. The sections 21 and 22 support grates 24 and 25 respectively. The section 21 is provided with a door 26 closing an opening through the rear wall 4 of the furnace, and the section 22 is provided with a door 27 closing an opening through the front wall 3 of the furnace.

Above the sections of the fire boxes is a combustion chamber 28, the top of which is filled in to direct the heat toward the vertical division walls 5 and 6. Through the vertical division wall is formed three rows of openings 29, 30 and 31 which communicate with the oven in different vertical planes. The openings 31 continue along the bottom 7 of the oven and communicate with the flue 12 running in the lengthwise direction of the furnace.

Over the openings 31 are located bricks 32 in two courses and each course is of several tiers, and on top of the top course of bricks are located other bricks 33 in rows transverse of the oven, leaving passage ways between them. On these bricks 33 is located a metallic box 34 containing the material to be treated, and on top of this box 34 are located bricks 35 in tiers so that openings extending transversely of the box will be formed, and on these bricks 35 is located another metallic box 36 containing material to be treated.

The heat generated by the combustion of the fuel placed on the grates 24 and 25 will pass through the openings 29, 30, and 31, around the metallic boxes 34 and 36, and escape by way of the flues 12 and 11 into the lower flue 13, and past the damper to the smoke pipe or flue. After the contents of the metallic boxes have been subjected to the proper degree of heat for the proper length of time, the fires are withdrawn and the kiln allowed to cool, after which the door 16 and bungs 19 are removed and the boxes taken out, and others placed in the oven which is again closed and the fire again started.

I claim as my invention.

1. A furnace comprising an oven, removable bungs for the top of the oven, a door for one end of the oven, descending flues through the bottom of the oven, a flue connecting the upper ends of the descending flues, a flue connecting the lower ends of the descending flues, a combustion chamber located along each side of the oven, and openings from the combustion chambers into the oven.

2. A furnace comprising an oven, removable bungs for the top of the oven, a door for one end of the oven, descending flues through the bottom of the oven, a flue connecting the upper ends of the descending flues, a flue connecting the lower ends of the descending flues, a combustion chamber located along each side of the oven, openings from the combustion chambers into the oven above the bottom thereof and openings from the combustion chambers communicating with the flue connecting the upper ends of the descending flues.

3. A furnace comprising an oven, removable bungs for the top of the oven, a door for one end of the oven, descending flues through the bottom of the oven, a flue connecting the upper ends of descending flues, a flue connecting the lower ends of the descending flues, a combustion chamber located along each side of the oven, and two series of openings from each combustion chamber into the oven above the bottom thereof.

In testimony whereof I have hereunto set my hand in presence of two subscribing witnesses.

WILLIAM A. CLARKE.

Witnesses:
　A. O. BEHEL,
　E. D. E. N. BEHEL.